US 9,954,859 B2

United States Patent
Niset et al.

(10) Patent No.: US 9,954,859 B2
(45) Date of Patent: Apr. 24, 2018

(54) RANDOM NUMBER DISTRIBUTION

(71) Applicant: ID Quantique SA, Carouge (CH)

(72) Inventors: Julien Niset, Brussels (BE); Louis-Philippe Lamoureux, Ottawa (CA)

(73) Assignee: ID QUANTIQUE SA, Carouge (CH)

( * ) Notice: Subject to any disclaimer, the term of this patent is extended or adjusted under 35 U.S.C. 154(b) by 0 days.

(21) Appl. No.: 14/562,308

(22) Filed: Dec. 5, 2014

(65) Prior Publication Data
US 2015/0089230 A1 Mar. 26, 2015

Related U.S. Application Data

(63) Continuation of application No. PCT/EP2013/061664, filed on Jun. 6, 2013.

(30) Foreign Application Priority Data

Jun. 6, 2012 (GB) .................. 1210004.6

(51) Int. Cl.
*H04L 9/32* (2006.01)
*H04L 29/06* (2006.01)
(Continued)

(52) U.S. Cl.
CPC ........ *H04L 63/0876* (2013.01); *G06F 21/606* (2013.01); *H04L 9/0825* (2013.01);
(Continued)

(58) Field of Classification Search
CPC ... H04L 9/3244; H04L 9/3281; H04L 63/123; H04L 9/0825; H04L 9/0869; H04L 9/3242
(Continued)

(56) References Cited

U.S. PATENT DOCUMENTS 3,713,142 A * 1/1973 Getchell .............. G08B 26/002
340/505
5,164,988 A * 11/1992 Matyas ................... G06F 21/79
380/279
(Continued)

FOREIGN PATENT DOCUMENTS

EP 0808972 A2 11/1997
WO 9534353 A2 12/1995

OTHER PUBLICATIONS

From Wikipedia, "Message Authentication Code", May 22, 2012, XP055084388, Retrieved from the Internet: URL: http://en.wikipedia.org/w/index.php?title=Message_authentication_code&oldid=493886624 [retrieved on Oct. 18, 2013].

*Primary Examiner* — Tae Kim
*Assistant Examiner* — Peiliang Pan
(74) *Attorney, Agent, or Firm* — BainwoodHuang

(57) ABSTRACT

A computer device includes means for receiving a request for at least one random number; means for generating a message authentication code from the identifier and at least one random number to be transmitted; and means for creating a message for transmission, including the random number in plain text and the message authentication code. A random number distribution system includes the computer device; a communication network; and a receiver device connectable to the computer device via the network to transmit requests for random numbers to the computer device and to receive messages from the computer device.

23 Claims, 3 Drawing Sheets

(51) Int. Cl.
*G06F 21/60* (2013.01)
*H04L 9/08* (2006.01)

(52) U.S. Cl.
CPC .......... *H04L 9/0869* (2013.01); *H04L 9/3242* (2013.01); *H04L 63/123* (2013.01)

(58) Field of Classification Search
USPC ................................ 713/161, 170, 176, 181
See application file for complete search history.

(56) References Cited

U.S. PATENT DOCUMENTS

| | | | | |
|---|---|---|---|---|
| 6,263,146 | B1* | 7/2001 | Umeno | G06E 3/005 385/147 |
| 2002/0049912 | A1* | 4/2002 | Honjo | G06F 21/335 726/10 |
| 2002/0120838 | A1* | 8/2002 | Abdulkader | H04L 9/12 713/153 |
| 2003/0187737 | A1* | 10/2003 | Naito | G06Q 30/0257 705/14.55 |
| 2005/0102336 | A1* | 5/2005 | Castejon-Amenedo | G06F 7/58 708/250 |
| 2005/0273843 | A1* | 12/2005 | Shigeeda | H04L 63/0807 726/5 |
| 2006/0088157 | A1 | 4/2006 | Fujii | |
| 2006/0291649 | A1* | 12/2006 | Crandall | H04L 9/001 380/46 |
| 2007/0044143 | A1* | 2/2007 | Zhu | G06F 21/33 726/8 |
| 2007/0074040 | A1* | 3/2007 | Lakshmeshwar | G06F 21/32 713/186 |
| 2009/0055916 | A1* | 2/2009 | McGarvey | H04L 9/3213 726/8 |
| 2009/0094372 | A1* | 4/2009 | Nyang | H04L 63/168 709/229 |
| 2009/0287929 | A1 | 11/2009 | Kolesnikov et al. | |
| 2009/0300364 | A1 | 12/2009 | Schneider | |
| 2010/0211780 | A1* | 8/2010 | Mukkara | H04L 63/0823 713/168 |
| 2010/0299517 | A1* | 11/2010 | Jukic | H04L 63/0823 713/150 |
| 2011/0055553 | A1 | 3/2011 | Lee et al. | |
| 2013/0073598 | A1* | 3/2013 | Jacobson | G06F 7/588 708/252 |
| 2013/0097419 | A1* | 4/2013 | Lu | H04L 9/08 713/155 |

* cited by examiner

RANDOM NUMBER DISTRIBUTION

BACKGROUND OF THE INVENTION

The invention relates to a computer device and system for random number distribution over a network.

The exponential growth of networks such as the Internet has shaped the new economic and cultural society in which we live in. These networks are made of countless numbers of machines that enable its users to share and access a vast amount of information in a short period of time.

Two clear trends are accountable for this situation. The first is the convergence of infrastructure and shared services that are giving rise to so-called cloud computing. Cloud computing allows enterprises and organizations to get their applications up and running faster, with easier manageability and less maintenance. It also enables IT to adjust IT resources (such as servers, storage, and networking) more rapidly to meet fluctuating and unpredictable demands. The second trend is the proliferation of devices that connect with other devices through networks. Machine-to-Machine (M2M) allows networked machines to exchange information and perform actions without the manual assistance of humans.

Often, the information transiting over these networks is destined for a specific user and thus carries a certain level of trust and confidentiality. This is typically achieved using so-called cryptographic algorithms: mathematical manipulations of information that enable different protection levels such as authentication of the communicating parties, or integrity and privacy of the exchanged information. The primary ingredient of most cryptographic algorithms is a secret key. It is used by the algorithm to, e.g., blind the relevant information in transit. Secret keys are a sequence of unpredictable numbers with uniform distribution. They are produced from random numbers and should remain unpredictable to any unauthorized users.

Random numbers however are difficult to produce as the software applications that require them are limited by their deterministic nature. Indeed, machines cannot rely on their own operating systems to produce random numbers and must seek random events from physical random phenomena that they can have access to. Peripheral activity such as mouse movements, keyboard strokes, and hard disk motion are typical examples of randomness sources.

In many cases however there is a flagrant lack of peripherals. Data centre servers for example are not connected to mice or keyboards. To make matters worse, these same servers often perform virtualization in an effort to reduce costs thereby increasing the demand for the server's different resources including the available randomness. The lack of peripherals also affects other machines such as hand held devices. Indeed, smart phones and tablets are now allowing users to perform more sophisticated and confidential tasks such as accessing email accounts or online banking. Without the ability to produce good quality secret keys, these tasks become major security loopholes putting the user at risk.

In the absence of sufficient peripherals it is common practice to use a pseudo random number generator (PRNG). A PRNG is a deterministic algorithm for generating a sequence of uniformly distributed numbers that only approximates the properties of genuine random numbers. The sequence is not truly random in that it is completely determined by a relatively small set of initial parameters and eventually repeats due to the finiteness of the machine on which it is running. To initialize a sequence, the algorithm employs an internal state of the machine (called a seed) such as the machine's current time. The algorithm will always produce the same sequence thereafter when initialized with the same seed. Even though the finite period of certain PRNGs can be very long, this resource becomes meaningless in a cryptographic context if an untrusted unauthorized party can correctly guess the PRNG algorithm as well as the initial seed used to generate the random numbers. Several attacks targeting pseudo random number generators have been cited over the last decade (see e.g., www.isoc.org/isoc/conferences/ndss/10/pdf/15.pdf).

A cryptographically safer alternative in generating secret keys is to use a hardware random number generator (HRNG). A HRNG is an apparatus that generates uniformly distributed random numbers from a physical process. Such devices are often based on physical systems such as thermal noise, avalanche noise, or time drift. Depending on the generation rate of the HRNG and the requirements of a given machine, the HRNG can either feed the machine locally (e.g. the HRNG is installed on the mother board or connected via USB) or at a distance (e.g. through a network). The former method is equivalent, from the machine's perspective, to having access to a physical peripheral producing good quality randomness (such as a mouse or keyboard). The latter is equivalent, from the machine's perspective, to having access to a virtual peripheral connected to a delocalized source of good quality randomness distributing random numbers over a network. In this case a machine requests random numbers over the said network whenever its applications are in need of random numbers. These applications will then go on to produce secret keys and apply cryptographic algorithms that will enable secure communication with other machines standing on the same or different network.

Delocalizing and distributing random numbers through a single (or several), HRNG(s) deployed within a network to provision a number of machines is a recent idea that offers many advantages. Most importantly this centralized approach reduces the cost of ownership and management of resources. Indeed, given the size of modern datacentres which can host tens of thousands of servers, installing, running and maintaining a HRNG such as a USB key on each of these servers can rapidly become a daunting and expensive task.

Delocalizing random number generation however raises two problems. The first problem is to guarantee the availability of sufficient random numbers for the myriad of machines connected to the random number generating source. New designs of high-bandwidth HRNGs such as the quantum based HRNG described in WO 2011/023501, can solve this problem.

The second and most important problem concerns the security of the distributed random numbers. In order to be suitable for cryptographic applications, the random numbers requested and consumed by a server must provide a certain level of trust and privacy.

SUMMARY OF THE INVENTION

According to one aspect of the present invention, there is provided a computer device for transmitting random numbers over a network, the computer device comprising:
  means for receiving a request for at least one random number;
  means for generating a message authentication code from at least one random number to be transmitted;

means for creating a message for transmission, comprising the random number in plain text and the message authentication code.

According to another aspect of the present invention, there may be provided a computer device for transmitting random numbers over a network, the computer device comprising:
means for receiving a request for at least one random number, the request including an identifier;
means for generating a message authentication code from the identifier and at least one random number to be transmitted;
means for creating a message for transmission, comprising the random number in plain text, the identifier and the message authentication code.

Another aspect of the present invention provides a random number distribution system comprising a computer device as above defined;
a communication network; and
at least one receiver device connectable to the computer device via the network to transmit requests for random numbers to the computer device and to receive messages from the computer device.

A still further aspect of the present invention provides a receiver device for receiving random numbers over a network, the receiver device comprising:
means for receiving a random number in plain text;
means for applying a function to the random number using a private key to generate a private random bit string.

A still further aspect of the present invention may provide a receiver device for receiving random numbers over a network, the receiver device comprising:
means for receiving a random number in plain text;
means for verifying a message authentication code from the identifier and the received random numbers;
means for applying a function to the random number using a private key to generate a private random number string.

A still further aspect of the present invention provides a method of transmitting random numbers over a network comprising:
receiving a request for a random number;
generating a message authentication code from at least one random number to be transmitted; and
creating a message for transmitting comprising the random number in plain text and the message authentication code.

A still further aspect of the present invention may provide a method of transmitting random numbers over a network comprising:
receiving a request for a random number, the request including an identifier;
generating a message authentication code from the identifier and at least one random number to be transmitted; and
creating a message for transmitting comprising the random number in plain text, the identifier and the message authentication code.

A still further aspect of the present invention provides a method of generating private random bit strings, comprising:
receiving a random number in plain text and applying a function to the plain text random number with a private key to thereby generate a private random number bit string.

In addition, the invention provides a computer program product which comprises program code which when executed by a processor implements either of the above-defined methods.

There is also envisaged a computing device which comprises a processor and memory holding code which when executed implements either of the above-defined methods.

The following described embodiments of the present invention provide significant advantages in the context of securely distributing random numbers efficiently. It is a particular advantage of the present invention that encryption of the random numbers is avoided. Having a protocol that can maintain privacy of a sequence of random numbers without the high resources costs of encryption for a centralised hardware random number generator maintains that the same level of security as its classical counterparts while minimising resources.

BRIEF DESCRIPTION OF THE DRAWINGS

For a better understanding of the present invention and to show how the same may be carried into effect, reference will now be made to the Figures by way of example in which.

DESCRIPTION OF THE PREFERRED EMBODIMENT

Figure 1:
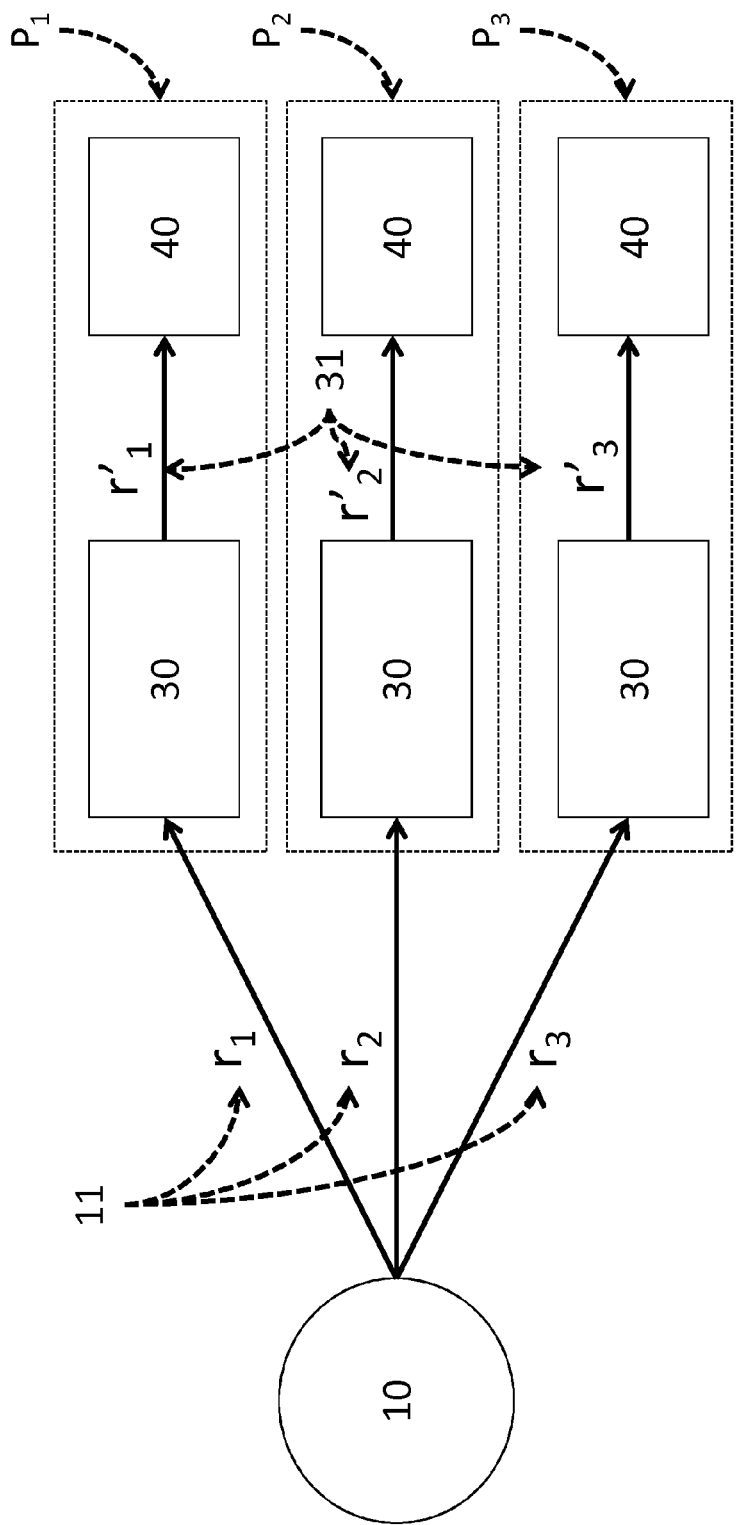
FIG. 1 is a general diagram representing the layout for a secure random number generation protocol with 3 distinct machines.

The following described embodiments of the present invention address the problems discussed above. Of importance, random numbers requested and consumed by a receiving device such as a server should provide a certain level of trust and privacy.

In particular, given a sequence of n random numbers, say bits, consumed by a server, it must be impossible for any unauthorized party (regardless of what information or computing power they possess) to guess the next bit the server will consume with a probability greater than ½. In order to guarantee this level of security, the protocol that transports the random numbers from the HRNG to the cryptographic application should preferably fulfil four services:

Authentication of the HRNG device: The assurance of a receiving machine that the received random numbers come from a generator device who is who it claims to be.

Integrity of the distributed random numbers: The assurance to a machine that the received random numbers have not been altered (intentionally or unintentionally) between "there" and "here," or between "then" and "now."

Privacy of the received random numbers: The assurance to a machine that no one can read the distributed random numbers except the said machine that explicitly requested them.

Uniqueness of the random numbers: The assurance that the received sequence of random numbers is unique and not maliciously or fraudulently repeated.

The optimal security protocol that will achieve the above listed four services is the one that does so with minimum resources (computational, network, and storage).

There exist several security protocols that guarantee these services (up to some generally accepted degree of confidence). The most common such protocols are the Secured Socket Layer (SSL/TLS) and the Secure Shell (SSH). Both protocols use asymmetric cryptography for an initial key exchange step, symmetric encryption for privacy, a combination of nounces and sequence number for uniqueness, and message authentication codes (MAC) for message authentication and integrity.

Because they were designed to securely transfer any kind of message content, these protocols are excessive in the amount of resources that must be supplied by the implicated machines. Encrypting and decrypting the content of the transiting message for example requires resources from both ends. The purpose of encryption is to blind the message content during its transit to ensure privacy, i.e. to make it look like it is random. This is typically done with a symmetric encryption algorithm (e.g. the Advanced Encryption Standard) that transforms the plaintext message into a cipher text message via a well-defined function. Typically the function is highly nonlinear with strong confusion and diffusion properties. The resulting cipher text message is a sequence of random numbers devoid of any informational content. This guarantees that a potential eavesdropper does not gain any information about the message during its transit.

When the plaintext is a sequence of random numbers, symmetric encryption during transit transforms the sequence of random numbers into another sequence of random numbers with identical statistical properties. Indeed, a sequence of random numbers does not contain any information per se in the context of Shannon information. From a mathematical point of view, if the sender and receiver share the secret key k, the plaintext message is expressed by the random-bit string m and the encryption function by $f$, then $f(m,k)=m'$ where m' is the encrypted message, also composed of random numbers. Decrypting m' requires applying the inverse function: $f^1(m',k)=m$.

While it is relatively easy for a requesting device to handle the resource consuming decrypting function $f^1$, a centralized HRNG that serves random numbers to, e.g. several thousand machines, would find it extremely difficult, if not impossible, to handle the simultaneous encryption of the random numbers it generates using today's available computing power.

Accordingly, embodiments of the present invention relate to the distribution of random numbers in a network and more particularly to a method and means that distribute random numbers without the need for encryption. Indeed, given that the goal of encryption is to make an arbitrary plaintext look random, it is more efficient to distribute random numbers by sending them out in plaintext to a requesting machine and letting the machine render them private locally using the same kind of function as used in encryption. One aspect of the present invention provides a protocol for distributing random numbers with the following services: authentication, integrity, privacy and uniqueness. Here, machine is defined as any electronic device capable of communicating with other devices. They include, but are not limited to, personal computers, servers, mobile devices, smart meters, household appliances, etc.

Briefly it requires that each machine requesting random numbers be in possession of a locally generated secret key. This secret key is processed, along with the incoming random numbers, by a highly non-linear function producing a new random bit string. This new random bit string is private and only known by the machine.

In the preferred embodiment, each machine requesting random numbers is in possession of 2 locally generated secret keys. The first key is used to guarantee authentication of a transmitting device with an HRNG and the integrity and uniqueness of the random numbers. The second key is used for privacy as described above. When connecting to the HRNG device for the first time, each machine will undergo an initialization phase. The initialization phase serves to provide the HRNG device with the machine's first key. The HRNG device will use this key, along with a message authentication code (HMAC), to certify the HRNG device and the integrity of the transiting random numbers. Once the HRNG is in possession of this key, the machine can start requesting random numbers. To do so, the machine sends a request containing the amount of random numbers needed, and a unique identifier tag. The tag will be used to detect possible replay attacks and thus guarantee uniqueness of the incoming random bit sequence. Upon receipt of the request, the HRNG will produce the random numbers sequence. The HRNG will subsequently concatenate the random numbers sequence with the unique tag and calculates its HMAC using the machine's secret key.

The HRNG then sends the random numbers sequence in clear-text along with the resulting HMAC back to the machine. In the preferred embodiment, the user datagram protocol (UDP) is used to transfer the random numbers. This protocol is much lighter than its counterpart, the transmission control protocol (TCP). In particular, UDP is lighter than TCP because it does not require reliability (it cannot be known if the message will reach its destination) and is not ordered (the order in which messages arrive cannot be predicted). These two characteristics are not necessary in the present context as the addition of a HMAC implicitly contains information about the integrity of the transmitted data. If the machine receives less random numbers or if they arrive in a different order, the request will be discarded and the machine can renew its request.

Upon receipt of the random numbers sequence and the HMAC, the machine will calculate its own version of the HMAC using its secret key. If the result corresponds to what was received, the machine can confirm authentication of the HRNG, as well as integrity and uniqueness of the received public random numbers sequence.

The machine then applies a highly non-linear function on the random numbers sequence and its second locally generated secret key. The output of this function is another random numbers sequence this time known only by the machine. This renders the random numbers sequence private, only known to the machine.

FIG. 1 shows a layout of the system for 3 machines. The protocol can be used in the following context. A computer device 10 including an HRNG 8 (not shown in FIG. 1) is connected to a network (not shown) that can be accessed by receiver devices, herein machines (P1, P2, P3) via this same network. The machines supply requests 13 for random numbers to the HRNG via e.g. an agent (30) installed on each machine, and receive unique random numbers 11 (r1, r2, r3). This agent also serves to render the random numbers secure (as described later). The result is a private sequence of random numbers 31 ($r'_1$, $r'_2$, $r'_3$) that can be used by applications, 40, running on the machine.

It is assumed that any machine can supply requests for random numbers to the computer device 10 as long as they are connected on the same network. To provide the security services listed above, we assign a private/public key pair to the HRNG device, $K_{PRI}$ and $K_{PUB}$. A public key infrastructure (PKI) is provided to authenticate the key pair. The protocol between the HRNG device and one machine will now be described.

Figure 2:
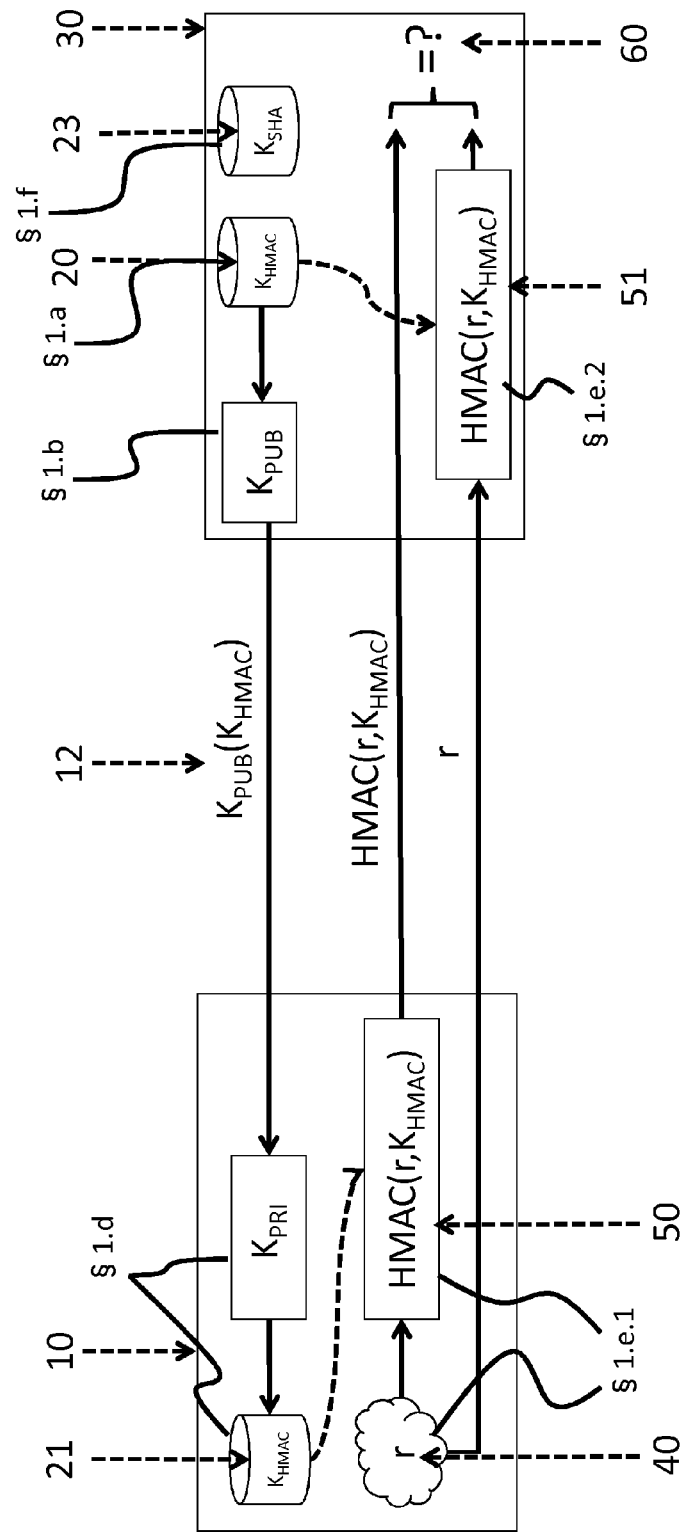
FIG. 2 is a diagram representing the initialization phase performed by HRNG and one machine.

1—Initialization. Reference is made to FIG. 2, in which the operations are identified as 1.a, 1.b, etc.
   a. The agent 30 generates and stores a secret key $K_{HMAC}$. One technique for generating the key uses random numbers gathered locally from sparse but unpredictable sources. As long as the public key of the HRNG device 10 will be trusted, this secret key will be used to authenticate the HRNG device 10 and confirm the integrity of all messages sent by the HRNG device 10 to the agent 30.
   b. The machine encrypts the secret key, $K_{HMAC}$, using the HRNG's public key, $K_{PUB}$.
   c. The machine sends the encrypted key 12 to the HRNG device 10 via the network. (not shown, but represented by the communication means between the object 30 and device 10).
   d. Upon receipt and decryption with private key $K_{PRI}$, the HRNG 10 device stores secret key $K_{HMAC}$ 21 (along with an identifier of the machine, such as the machine's IP address).
   e1. To confirm that the operation has been successfully implemented, the HRNG device generates a sequence of random numbers (r in the figure), calculates in block 50 the hash-based message authentication code (HMAC(r,$K_{HMAC}$)) of the random sequence r using secret key $K_{HMAC}$ 21 and sends both the HMAC (r,$K_{HMAC}$) and the original sequence r back to the agent 30.
   e2. The agent 30 then performs the same operation at block 51 to confirm in block 60 that the result HMAC (r, $K_{HMAC}$) at the machine is identical to the authentication code HMAC (r, $K_{HMAC}$) the HRNG device 10 has sent.
   f. The machine generates a second secret key $K_{SHA}$ 23 that will be kept locally. This key will be used to render private the incoming random numbers.
   g. The machine P1 and the HRNG device 10 are now ready to communicate.

Figure 3:
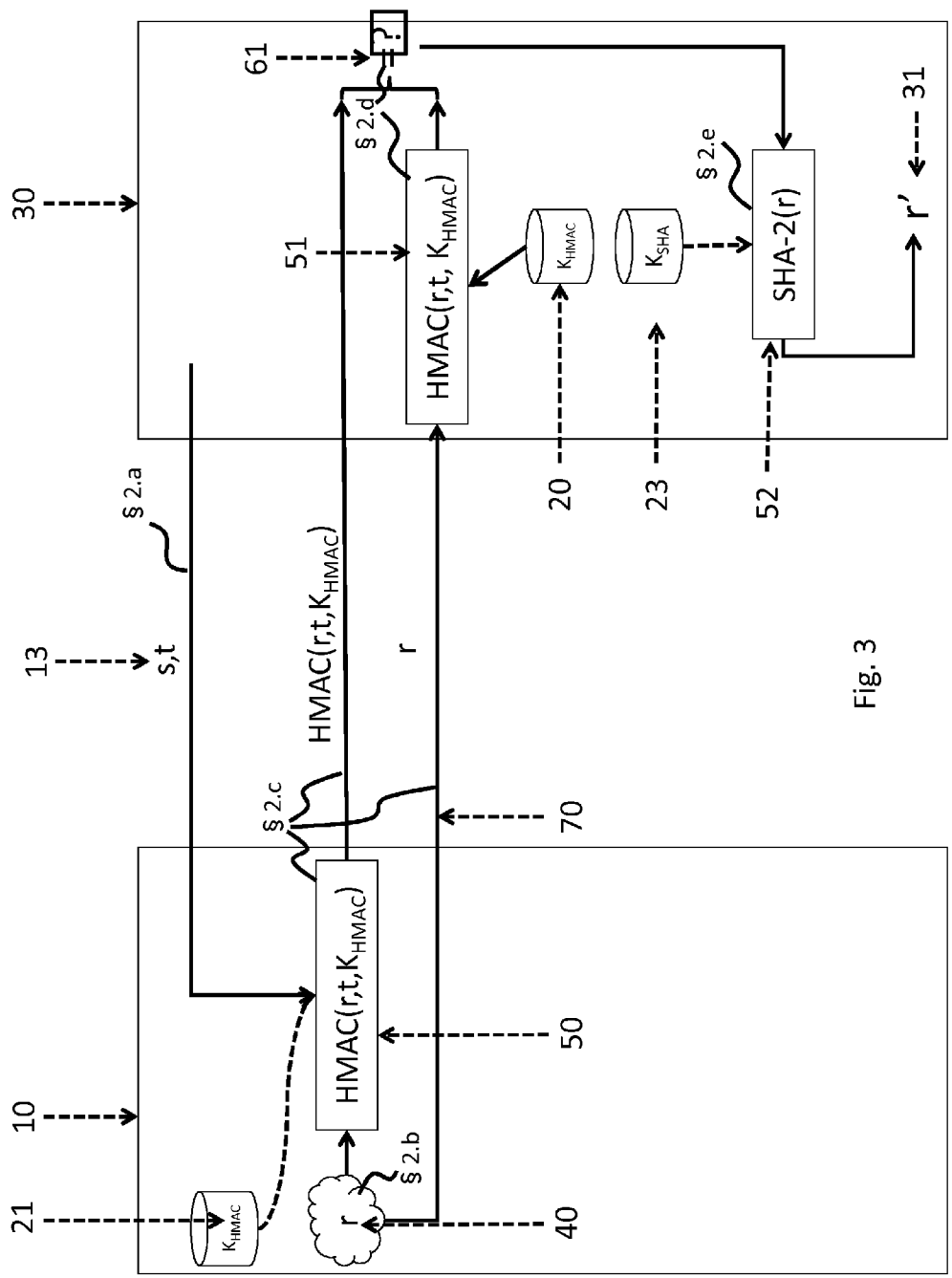
FIG. 3 is a diagram representing the secure distribution of random numbers between a HRNG and one machine.

2—Distributing Randomness. Reference is made to FIG. 3, in which the operations are identified as 2.a, 2.b, etc.
   a. The agent 30 makes a request for at least one random number to the HRNG device 10. The request 13 contains the number of random numbers that are requested (s in the figure) and a unique identifier tag number (t in the figure) that will be used to detect possible replay attacks and thus guarantee uniqueness.
   b. Upon receipt of the request 13, the HRNG 8 in device 10 will produce the random numbers sequence (r in the figure). Note that the random numbers can be generated at the time of the request, or be generated at an earlier time and stored in a buffer.
   c. The device 10 subsequently concatenates the random numbers sequence r with the unique tag t and calculates in block 50 its authentication code HMAC (r,t,$K_{HMAC}$) using the machines secret key $K_{HMAC}$ 21. The HRNG device 10 then sends back to the agent 30 the random numbers sequence r in plaintext along with the resulting HMAC(r, t, $K_{HMAC}$).
   d. Upon receipt of the random numbers sequence r and the HMAC (r,t,$K_{HMAC}$), the agent 30 calculates the HMAC in block 51 of the random numbers sequence r with the unique identifier t using its secret key $K_{HMAC}$ 20. The results are compared in block 61. If the result corresponds to what was received, the machine can confirm authentication of the HRNG device 10, as well as integrity and uniqueness of the received public random numbers sequence. If the result does not correspond, the random sequence is discarded. We note that using a unique identifier tag as described here is not the only method to guarantee some form of uniqueness. An alternative method could consist of e.g. the HRNG adding a timestamp to the message and including it in the calculation of the HMAC. This could certify to a receiver the time at which the sequence was generated and sent by the HRNG. A receiver would then only accept sequences generated within a certain time frame.
   e. The machine then applies in block 52 a function $f$, (e.g. the secure hash function SHA-2 in the figure) with the random numbers sequence r and the local secret key $K_{SHA}$ 23 as input. The output of this function is another random numbers sequence 31 ($r^1$ in the figure) this time known only to the machine. This renders the random numbers sequence private, only known to the agent 30.
   f. The random numbers can now be used to produce secret keys by the machine for any cryptographic purpose.

The choice of the function $f$ is an important one. Its purpose is to map the incoming public sequence of random numbers to another, private, sequence of random numbers that preserves the same statistical properties. This is done by mixing the public random sequence and the machine's local private key $K_{SHA}$. In a preferred embodiment, the function is chosen to be balanced such that all possible outputs are equiprobable. An example of such a function is the provably secure cryptographic hash function as specified in SHA-2 (see NIST FIPS PUB 180-2 publication).

To increase the security of the protocol, the machine can refresh both $K_{HMAC}$ and $K_{SHA}$ keys as often as it wants. Refreshing the $K_{HMAC}$ key requires going through the initialization steps to update the HRNG.

It will readily be appreciated that embodiments of the invention can be implemented in any suitable combination of hardware, firmware or software. In particular, the computer device and machines can have local memory for storing the keys. Alternatively, they could be stored in remote memory accessible by the computer device and machines, although this is not preferred because of the security aspect.

The blocks 50 and 51 for calculating the message authentication codes can be implemented as program code executed by a processor. Similarly, the block 52 for applying a function can be implemented as program code executable by a processor. In principle, a single processor at the agent 30 can execute all of the suitable code for implementing the functions of blocks 50, 51, 60, 61, 52.

Any suitable hardware random number generator can be utilised, but as already mentioned a particularly suitable HRNG is that described in WO 2011/023501.

While the preferred embodiment of the present invention has been described and disclosed, it will be recognized with those with skills in the art, that modifications are within the true spirit and scope of the invention. The appended claims are intended to cover all such modifications.

The invention claimed is:

1. A computer device for transmitting first random numbers over a network to a remote device to cause second random numbers to be generated at the remote device, the computer device including a hardware processor storing and executing computer program instructions to cause the computer device to perform a method including:

receiving an authentication key from a remote device connected to the computer device via the network, the authentication key being encrypted using a public key of the computer device;

decrypting the authentication key using a private key of the computer device and storing the authentication key in a memory of the hardware processor;

receiving a request from the remote device for a first random number, the request including a number of random numbers being requested;

generating a message authentication code from the first random number by using the authentication key and the first random number in a first hashing algorithm; and creating a message for transmission to the remote device, the message comprising the first random number in plain text and the message authentication code, to cause the remote device to authenticate the message using the authentication key which is shared with the computer device and to generate a second random number by applying a second hashing algorithm to a private key and the first random number at the remote device, the second hashing algorithm being distinct from the first hashing algorithm.

2. The computer device according to claim 1, wherein the memory holds a plurality of authentication keys each associated with respective remote devices, and wherein generating a message authentication code uses the authentication key associated with the remote device which has transmitted the request.

3. The computer device according to claim 1, which comprises a random number generator for generating at least one random number for responding to the request.

4. The computer device according to claim 3, wherein the random number generator is a hardware random number generator.

5. The computer device according to claim 4, wherein the hardware random number generator is a quantum random number generator.

6. The computer device according to claim 1, wherein the request includes an identifier, and the message authentication code is generated from said identifier and the first random number.

7. A random number distribution system comprising the computer device according to claim 1;
a communication network; and
at least one receiver device connectable to the computer device to serve as the remote device via the network to transmit requests for random numbers to the computer device and to receive messages from the computer device.

8. The random number distribution system according to claim 7, wherein the communication network for transporting the random numbers is public.

9. The random number distribution system according to claim 7, wherein the computer device and the receiver are in possession of a shared secret key which acts as the authentication key.

10. The random number distribution system according to claim 7, wherein the receiver device is one of a mobile device; and a server in a data centre.

11. The computer device according to claim 1, wherein the messages are transmitted using the user datagram protocol (UDP).

12. A receiver device for receiving random numbers over a network to provide therefrom private random numbers for consumption at the receiver device, the receiver device including a hardware processor storing and executing computer program instructions to cause the receiver device to perform a method including:
generating a request for a first random number, the request including a number of random numbers being requested;
receiving a message comprising the first random number in plain text and a message authentication code;
holding an authentication key in a memory of the hardware processor for use in a first hashing algorithm;
authenticating the first random number by: generating a comparison authentication code using the first random number and the authentication key in the first hashing algorithm, and comparing the comparison authentication code with the message authentication code;
holding a private key in the memory for use in a second hashing algorithm, the second hashing algorithm being distinct from the first hashing algorithm; and
applying the second hashing algorithm to the first random number using the private key to generate a bit string as a second, private random number.

13. The receiver device according to claim 12, wherein the request further includes an identifier, and the message authentication code is generated from the identifier and the first random number.

14. The receiver device according to claim 13, wherein, upon the first random number being authenticated, the first random number is supplied in plain text for use in the second hashing algorithm when the comparison authentication code matches the message authentication code.

15. The receiver device according to claim 12, wherein the second hashing algorithm is non-linear.

16. A method of transmitting random numbers over a network comprising:
storing an authentication key shared with a remote device via the network;
receiving a request for a first random number, the request including a number of random numbers being requested;
generating a message authentication code from the first random number by applying a first hashing algorithm to the first random number and the authentication key shared with the remote device;
creating a message for transmitting to the remote device, the message comprising the first random number in plain text and the message authentication code;
receiving the message at the remote device;
accessing an authentication key stored at the remote device;
authenticating the first random number by: generating a comparison authentication code using the first random number and the authentication key in the first hashing algorithm, and comparing the comparison authentication code with the message authentication code; and
when the comparison authentication code matches the message authentication code:
accessing a private key stored at the remote device; and
applying a second hashing algorithm to the first random number with the private key to thereby generate a bit string comprising a second, private random number for consumption at the remote device, the second hashing algorithm being distinct from the first hashing algorithm.

17. The method according to claim 16, wherein when the request is received at least one random number for transmission is generated.

18. The method according to claim 16, wherein the step of creating a message authentication code comprises combining the first random number in plain text with the authentication key.

19. The method according to claim 18 performed by a computer device, and comprising an initiation procedure including receiving the authentication key from the remote device, the authentication key being encrypted using a public key of the computer device, and decrypting the authentication key using a private key of the computer device.

20. The method according to claim 16, wherein the request includes an identifier, and the message authentication code is generated from said identifier and the first random number.

21. A method of generating private random bit strings at a computer device, comprising:
    generating a request for a first random number, the request including a number of random numbers being requested;
    receiving a message comprising the first random number in plain text and a message authentication code;
    accessing an authentication key stored at the computer device;
    authenticating the first random number by: generating a comparison authentication code using the first random number and the authentication key in a first hashing algorithm, and comparing the comparison authentication code with the message authentication code; and
    when the comparison code matches the message authentication code:
        accessing a private key stored at the computer device; and
        applying a second hashing algorithm to the first random number with the private key to thereby generate a bit string comprising a second, private random number for consumption at the computer device, the second hashing algorithm being distinct from the first hashing algorithm.

22. A receiver device for receiving random numbers over a network to provide therefrom private random numbers for consumption at the receiver device, the receiver device comprising:
    a hardware processor;
    a first store holding an authentication key for use in a first hashing algorithm;
    a second store holding a private key for use in a second hashing algorithm, the second hashing algorithm being distinct from the first hashing algorithm; and
    program code which when executed by the hardware processor causes the receiver device to:
        generate a request for a first random number, the request including a number of random numbers being requested;
        receive a message comprising the first random number in plain text and a message authentication code;
        authenticate the first random number by generating a comparison authentication code using the first random number and the authentication key in the first hashing algorithm, and compare the comparison authentication code with the message authentication code; and
        when the comparison authentication code matches the message authentication code, apply the second hashing algorithm to the first random number using the private key to generate a bit string as a second private random number, wherein the second, private random number is for consumption at the receiver device.

23. A computer device for transmitting first random numbers over a network to a remote device to cause second random numbers to be generated at the receiver device, the computer device comprising:
    a memory for storing an authentication key shared with the remote device, the authentication key having been received in public-key encrypted form from the remote device connected to the computer device via the network, the authentication key being decrypted using a private key of the computer device;
    a processor and program code which when executed by the processor causes the computer device to:
    receive a request from the remote device for a first random number, the request including a number of random numbers being requested;
    generate a message authentication code from the first random number by applying a first hashing algorithm to the first random number and the authentication key shared with the remote device;
    create a message for transmission to the remote device, the message comprising the first random number in plain text and the message authentication code, to cause the remote device to authenticate the message using the authentication key which is shared with the computer device and to generate a second random number by applying a second hashing algorithm using a private key at the remote device, the second hashing algorithm being distinct from the first hashing algorithm.

* * * * *